United States Patent
Zhang et al.

(10) Patent No.: US 11,480,050 B2
(45) Date of Patent: Oct. 25, 2022

(54) DEVICE AND METHOD FOR MEASURING FLOW VELOCITY AND FLOW DIRECTION AND GEOLOGICAL PARAMETERS OF GROUNDWATER THROUGH CROSS HOLES OF DEEP WELLS

(71) Applicant: ANHUI UNIVERSITY OF SCIENCE AND TECHNOLOGY, Huainan (CN)

(72) Inventors: Pingsong Zhang, Huainan (CN); Hua Cheng, Huainan (CN); Zhishu Yao, Huainan (CN); Guangquan Xu, Huainan (CN); Chuanxin Rong, Huainan (CN); Shenglin Li, Huainan (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 560 days.

(21) Appl. No.: 16/493,786

(22) PCT Filed: Jan. 8, 2019

(86) PCT No.: PCT/CN2019/070852
§ 371 (c)(1),
(2) Date: Sep. 13, 2019

(87) PCT Pub. No.: WO2019/233105
PCT Pub. Date: Dec. 12, 2019

(65) Prior Publication Data
US 2020/0270984 A1    Aug. 27, 2020

(30) Foreign Application Priority Data

Jun. 4, 2018  (CN) .......................... 201810564337.3

(51) Int. Cl.
*E21B 47/11* (2012.01)
*E21B 47/07* (2012.01)
(Continued)

(52) U.S. Cl.
CPC .............. *E21B 47/11* (2020.05); *E21B 47/07* (2020.05); *E21B 49/00* (2013.01); *E21B 49/0875* (2020.05); *G01V 3/20* (2013.01)

(58) Field of Classification Search
None
See application file for complete search history.

(56) References Cited

FOREIGN PATENT DOCUMENTS

| CN | 202562946 U | 11/2012 |
| CN | 103149382 A | 6/2013 |

(Continued)

OTHER PUBLICATIONS

Ren, et al., "A Study on Coal Measures Aquifer Groundwater Flow Rate and Current Direction Determination Methods", Coal Geology of China, Nov. 2012, vol. 24, No. 11, pp. 40-42 and 51, with an English Abstract. (4 pages).

(Continued)

*Primary Examiner* — Patrick Assouad
*Assistant Examiner* — Haidong Zhang

(57) ABSTRACT

A device for measuring a flow velocity and a flow direction and geological parameters of groundwater through cross holes of deep wells includes detectors and a device for throwing the tracer source. A method includes measuring a correspondence between a conductivity and a concentration of a tracer solution at different temperatures in a laboratory; selecting at least two boreholes; selecting a target aquifer section; placing the detectors in the target aquifer section in the hole to test a conductivity background value and a temperature value; using the device for throwing the tracer source to place the tracer solution in the hole for throwing the tracer source, and using the detectors to measure a water conductivity and temperature in a detection hole, to obtain a distribution curve of a tracer solution solubility with time;

(Continued)

performing cross-test, and calculating the seepage flow velocity and flow direction of groundwater in the hole.

5 Claims, 3 Drawing Sheets

(51) Int. Cl.
*E21B 49/08* (2006.01)
*E21B 49/00* (2006.01)
*G01V 3/20* (2006.01)

(56) References Cited

FOREIGN PATENT DOCUMENTS

| | | | |
|---|---|---|---|
| CN | 103197039 A | | 7/2013 |
| CN | 104808258 A | | 7/2015 |
| CN | 108756853 A | | 11/2018 |
| JP | 2001183471 A | * | 7/2001 |
| JP | 2005172574 A | | 6/2005 |
| JP | 2007256026 A | * | 10/2007 |
| JP | 2007256026 A | | 10/2007 |
| JP | 2011185703 A | | 9/2011 |
| KR | 100869168 B1 | * | 8/2008 |
| KR | 101773868 B1 | * | 9/2017 |

OTHER PUBLICATIONS

International Search Report (PCT/ISA/210) and Written Opinion (PCT/ISA/237) dated Apr. 8, 2019, by the State Intellectual Property Office of China as the International Searching Authority for International Application No. PCT/CN2019/070852.

\* cited by examiner

DEVICE AND METHOD FOR MEASURING FLOW VELOCITY AND FLOW DIRECTION AND GEOLOGICAL PARAMETERS OF GROUNDWATER THROUGH CROSS HOLES OF DEEP WELLS

TECHNICAL FIELD

The present invention relates to the technical field of groundwater parameter measurement, and in particular to a device and method for measuring a flow velocity and a flow direction and geological parameters of groundwater through cross holes of deep wells.

BACKGROUND

Groundwater velocity and flow direction are two important dynamic parameters in the study of a groundwater seepage field, and are the bases for determining an aquifer permeability coefficient and seepage flow. With the rapid development of underground engineering, basic parameters of groundwater seepage need to be mastered in more and more engineering construction to solve possible hidden dangers, such as deep-well grouting diffusion process, reservoir leakage inlet detection, river dam piping and seepage, mine water disaster prevention, highway bridge and culvert slope seepage, hydrogeological measurement and monitoring of underground railways, and foundation pit excavation and drainage, which are all related to the groundwater flow velocity and flow direction.

At present, conventional methods for determining groundwater flow velocity and flow direction mainly include a groundwater pumping test method and a tracer method. The former obtains a flow velocity and a flow direction through pumping test and water level maps obtained by triangle observation hole water level drawing. This method not only disturbs a natural flow field, but also has a high test cost and complicated test process, and is difficult to implement especially when a burial depth of an aquifer is large. The tracer method is mainly a single well isotope dilution technique with a radioisotope as a tracer. In 1957, German scientist Moser first proposed the use of radioisotopes as an indicator to measure the flow velocity and flow direction of groundwater in a single well. So far, countries around the world have used this method to measure the infiltration flow velocity and flow direction of groundwater in aquifers for nearly sixty years, and achieved good results. However, the isotope single-hole dilution test is a radioactive operation during the tracer delivery process. The radioisotope storage, on-site delivery, protection, testing, and supporting staff's cooperative operations are prone to radioactive accidents, which cause extremely serious harm to the health of the staff and the environment. Radioactive tracers are rare, and it is necessary to re-examine whether a radioactive tracer is applicable before each use, which has certain limitations. In particular, there is a certain difficulty in real-time measurement of basic parameters of groundwater aquifers in deep wells. Therefore, it is necessary to further provide a method and device for measuring a seepage flow velocity and flow direction of groundwater aquifers in deep wells.

SUMMARY

An objective of the present invention is to provide a device and method for measuring a flow velocity and a flow direction and geological parameters of groundwater through cross holes of deep wells, to solve the above problems in the prior art, and to efficiently, quickly and accurately measure a groundwater flow velocity and flow direction and related hydrogeological parameters of groundwater, without radioactive pollution.

To achieve the above purpose, the present invention provides the following technical solutions.

A device for measuring a flow velocity and a flow direction and geological parameters of groundwater through cross holes of deep wells includes detectors and a device for throwing the tracer source, where the detectors are placed in a test hole; the device for throwing the tracer source is placed in a hole for throwing the tracer source; the detectors are connected with a data acquisition instrument, and the device for throwing the tracer source is connected with a source adding control instrument.

Optionally, the detectors and the device for throwing the tracer source are respectively disposed on a cable, and move up and down in the test hole and the hole for throwing the tracer source respectively through fixed pulleys located outside the test hole and the hole for throwing the tracer source.

Optionally, the detectors each have two probes, including a resistivity instrument probe and a high-precision temperature-sensing unit.

Optionally, three sets of detectors are mounted on the cable in the test hole at equal intervals.

Optionally, a contraction/release length of the cable located in the test hole and the hole for throwing the tracer source is not greater than a depth of a target aquifer section in the test hole and the hole for throwing the tracer source.

A method for measuring a flow velocity and a flow direction and geological parameters of groundwater through cross holes of deep wells includes the following steps:

step (1): measuring a correspondence between a conductivity and a concentration of a tracer solution at different temperatures in a laboratory;

step (2): selecting boreholes, where the number of the boreholes is at least two;

step (3): geologically cataloging lithology of the boreholes, and selecting a target aquifer section;

step (4): selecting two target boreholes, placing detectors in the target aquifer section in the hole, and testing a conductivity background value and a temperature value;

step (5): with respect to the two target boreholes in step (4), using one of the boreholes as a detection hole for placing the detectors, and using the other borehole as a hole for throwing the tracer source for placing a device for throwing the tracer source; using the device for throwing the tracer source to place the tracer solution in the hole for throwing the tracer source, and using the detectors to measure a water conductivity and temperature in the detection hole, to obtain a distribution curve of a tracer solution solubility with time;

step (6): after the test is completed, interchanging the detection hole and the hole for throwing the tracer source, performing cross-test, and testing the conductivity background value once again before the test; and step (7): using the obtained distribution curve of the tracer solution solubility with time to calculate the seepage flow velocity and flow direction of groundwater in the hole.

Optionally, the flow rate of water in the actual borehole includes the vertical flow rate and the horizontal flow rate. Since the average seepage flow rate between the two points is detected, the density flow effect of the salt solution tracer is not important. A calculation formula adopted in step (7) is:

$$v_i = \frac{\Delta L}{\Delta T};$$

where $v_1$ represents a seepage flow velocity of groundwater measured by a set of detectors, taking values of 1, 2, and 3; $\Delta L$ represents a linear distance between the test hole and a target aquifer of the hole for throwing the tracer source; $\Delta T$ represents the time of each test;

three sets of detectors are installed on the cable in the test hole; each set of detectors measures a seepage flow velocity of groundwater for each test, and the three sets of flow velocities are averaged to obtain a final seepage flow velocity of groundwater:

$$v = \frac{v_1 + v_2 + v_3}{3}.$$

Optionally, the tracer solution is a salt solution.

Optionally, for each test, the time when the solubility of the tracer solution reaches a maximum value and remains stable is taken as an end time point, and the test time when a highest solubility value is reached is an end time point.

Optionally, the conductivity and temperature of groundwater are tested in the boreholes, and a concentration of a tracer solution in the groundwater is obtained according to a correspondence between the conductivity and the tracer solution concentration measured at different temperatures in the laboratory; and when the data acquisition instrument acquires data, the time is recorded synchronously, thereby obtaining a distribution curve of the tracer solution solubility with time.

Compared with the prior art, the present invention achieves the following technical effects:

The method of the present invention has clear principle, simple and convenient measurement process, accurate and reliable results, and wide applicability; components used in the method are universal, no special treatment is required, the cost is low, and the method is easy to implement; the method uses a salt solution as a tracer, and no radioactive accidents occur, avoiding causing extremely serious harm to the personal health of staff and the environment. The groundwater flow velocity and flow direction and related hydrogeological parameters of groundwater can be efficiently, quickly and accurately measured without radioactive pollution.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

where 1. detector, 2. device for throwing the tracer source, 3. test hole, 4. hole for throwing the tracer source, 5. data acquisition instrument, 6. source adding control instrument, 7. cable, 8. fixed pulley.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a device and method for measuring a flow velocity and a flow direction and geological parameters of groundwater through cross holes of deep wells, to solve the above problems in the prior art, and to efficiently, quickly and accurately measure a groundwater flow velocity and flow direction and related hydrogeological parameters of groundwater, without radioactive pollution.

To make the foregoing objective, features, and advantages of the present invention clearer and more comprehensible, the present invention is further described in detail below with reference to the accompanying drawings and specific embodiments.

Figure 1:
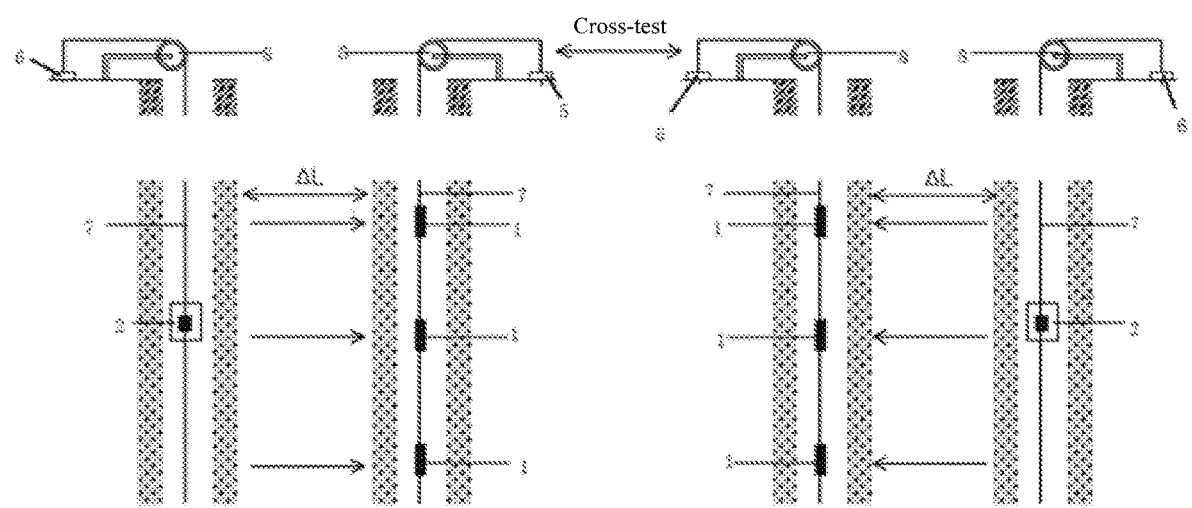
FIG. 1 is a schematic view showing a layout of a solution for measuring a flow velocity and a flow direction and geological parameters of groundwater through cross holes of deep wells according to the present invention.
Figure 2:
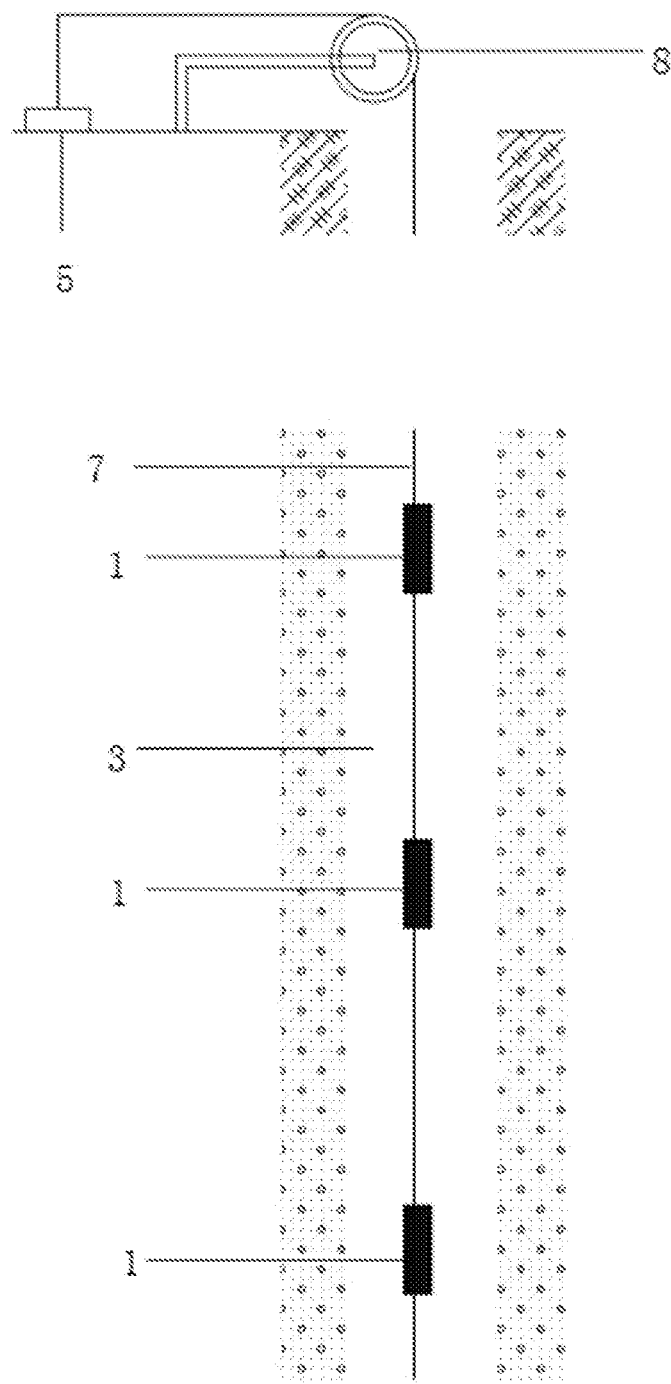
FIG. 2 is a schematic view showing an arrangement of a test hole according to the present invention.
Figure 3:
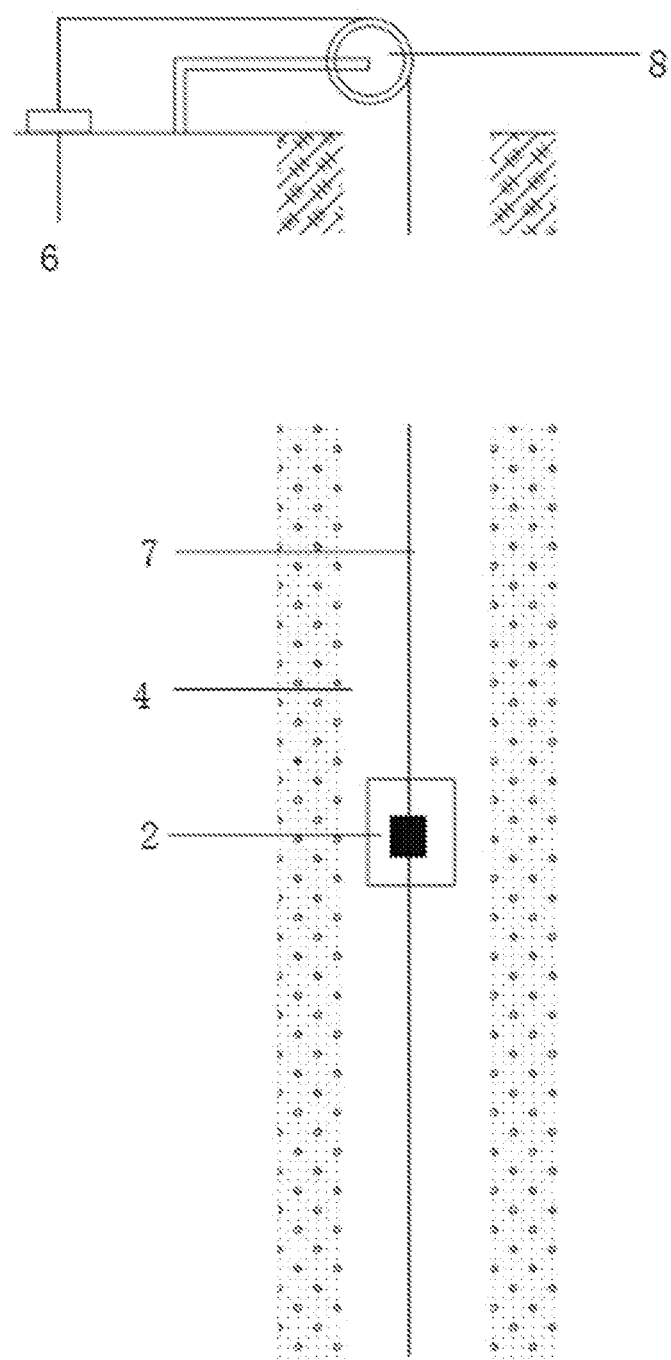
FIG. 3 is a schematic view showing the arrangement of a hole for throwing the tracer source according to the present invention.

The present invention provides a device for measuring a flow velocity and a flow direction and geological parameters of groundwater through cross holes of deep wells. As shown in FIGS. 1, 2 and 3, the device includes detectors 1 and a device 2 for throwing the tracer source, where the detectors 1 are placed in a test hole 3; the device 2 for throwing the tracer source is placed in a hole 4 for throwing the tracer source; the detectors 1 are connected with a data acquisition instrument 5, and the device 2 for throwing the tracer source is connected with a source adding control instrument 6. The detectors 1 and the device 2 for throwing the tracer source are respectively disposed on a cable 7, and move up and down in the test hole 3 and the hole 4 for throwing the tracer source respectively through fixed pulleys 8 located outside the test hole 3 and the hole 4 for throwing the tracer source. The detectors 1 each have two probes, including a resistivity instrument probe and a high-precision temperature-sensing unit. Three sets of detectors 1 are mounted on the cable 7 in the test hole 3 at equal intervals. A contraction/release length of the cable 7 located in the test hole 3 and the hole 4 for throwing the tracer source is not greater than a depth of a target aquifer section in the test hole 3 and the hole 4 for throwing the tracer source.

The above-mentioned method for measuring a flow velocity and a flow direction and geological parameters of groundwater through cross holes of deep wells according to the present invention includes the following steps:

Step (1): before the measurement work, measure a correspondence between a conductivity and a concentration of a tracer solution at different temperatures in a laboratory, where the test temperature is selected in a mode of floating up and down based on a temperature at the position of a target aquifer in a selected borehole in step (4).

Step (2): according to the engineering requirements, select a position having geological stability and having no crushed zone as a sampling hole position, and drill boreholes, where the number of the boreholes is two or more.

Step (3): geologically catalog lithology of the boreholes, and select a target aquifer section.

Step (4): select two target boreholes, use a winch to place the cable into the two boreholes respectively through fixed pulleys, where detectors 1 are installed on the cable 7, three sets of detectors 1 are mounted on the cable 7, and the detectors 1 each have two probes, including a resistivity instrument probe and a high-precision temperature-sensing unit. The other end of the cable 7 is connected with a data acquisition instrument 5, to test a conductivity background value and a temperature value.

Step (5): with respect to two target boreholes, use one of the boreholes as a test hole 3 for placing the detectors 1, and use the other borehole as a hole 4 for throwing the tracer source for placing the device 2 for throwing the tracer source. A salt solution is placed in a target aquifer section in the hole 4 for throwing the tracer source, use a winch on the ground to contract or release the cable 7 up and down, the contraction/release length of the cable 7 does not exceed the depth of the target aquifer section in the hole, the hole 4 for throwing the tracer source moves up and down with the cable 7, and the salt solution in the hole 4 for throwing the tracer source is evenly distributed in the target aquifer section in the hole with the movement; and the water conductivity and temperature in the hole are measured in the test hole 3. The conductivity and temperature of groundwater are tested in the hole, and a concentration of a tracer solution in the groundwater is obtained according to a correspondence between the conductivity and the tracer solution concentration measured at different temperatures in the laboratory. When the data acquisition instrument acquires data, time is recorded synchronously, thereby obtaining a distribution curve of the water solubility of salt with time.

(6) When the solubility of the tracer solution of the target aquifer section in the test hole reaches a highest value and remains stable, the first test is completed. As shown in FIG. 1, the test hole 3 and the hole 4 for throwing the tracer source are interchanged, the borehole for the detectors 1 to be placed in previously is for the device 2 for throwing the tracer source to be placed in, the borehole for the device 2 for throwing the tracer source to be placed in previously is for the detectors 1 to be placed in, the second test is performed, and the conductivity background value is tested once again before the testing.

(7) After the tracer solution is placed into the borehole, the solubility of the tracer solution will vary upstream and downstream of water flow with the natural flow of the groundwater, and the solubility of the tracer solution downstream of the water flow will increase. The present invention utilizes an inter-hole cross-test method, and a test system is arranged between two boreholes, the test is performed twice, and it is measured in the test hole that the direction of the increase of the solubility of the tracer solution is from the adding source hole to an observation hole, which is a groundwater seepage flow direction. Since the tracer solution is put into the hole in the first test, the conductivity value of the water in the hole is changed, so the conductivity background value needs to be tested once again before the second test.

After the tracer solution is placed into the borehole, the solubility of the tracer solution will vary upstream and downstream of water flow with the natural flow of the groundwater, and the solubility of the tracer solution downstream of the water flow will increase. The present invention utilizes an inter-hole cross-test method, and a test system is arranged between two boreholes, the test is performed twice, and it is measured in the test hole that the direction of the increase of the solubility of the tracer solution is from the adding source hole to the observation hole, which is a groundwater seepage flow direction.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:
1. A method for measuring a flow velocity and a flow direction and geological parameters of groundwater through cross holes of wells, comprises the following steps
   step (1): measuring a correspondence between a conductivity and a concentration of a tracer solution at different temperatures in a laboratory;
   step (2): selecting boreholes, wherein the number of the boreholes is at least two;
   step (3): geologically cataloging lithology of the boreholes, and selecting a target aquifer section;
   step (4): selecting two target boreholes, placing detectors in the target aquifer section in the hole, and testing a conductivity background value and a temperature value;
   step (5): with respect to the two target boreholes in step (4), using a first target borehole of the two target boreholes as a detection hole for placing the detectors, and using a second target borehole of the two target borehole as a hole for throwing the tracer source to place a device for throwing the tracer source; and using the detectors to measure a water conductivity and temperature in the first target borehole to obtain a distribution curve of a tracer solution solubility with time in the first target borehole;
   step (6): testing the conductivity background value and the temperature value again; placing the device for throwing a tracer source into the first target borehole and using the first target borehole as the hole for throwing the tracer source; placing the detectors into the second target borehole and using the second target borehole as the detection hole; using the detectors to measure a water conductivity and temperature in the second target borehole to obtain a distribution curve of a tracer solution solubility with time in the second target borehole;
   step (7): using the distribution curve of the tracer solution solubility with time in the first target borehole and the distribution curve of the tracer solution solubility with time in the second target borehole to calculate seepage flow velocity and flow direction of groundwater in the two target borehole.
2. The method for measuring the flow velocity and the flow direction and geological parameters of groundwater through cross holes of wells according to claim 1, wherein a seepage flow velocity of groundwater is calculated by:

$$v_i = \frac{\Delta L}{\Delta T}$$

wherein Vi represents a seepage flow velocity of groundwater measured by a set of detectors, taking values of 1, 2, and 3; ΔL represents a linear distance between the test hole and a target aquifer of the hole for throwing the tracer source; ΔT represents the time of each test; three sets of detectors are installed on the cable in the test hole; each set of detectors measures a seepage flow velocity of groundwater for each test, and the three sets of flow velocities are averaged to obtain a final seepage flow velocity of groundwater $$v = \frac{v_1 + v_2 + v_3}{3}.$$

3. The method for measuring the flow velocity and the flow direction and geological parameters of groundwater through cross holes of wells according to claim 1, wherein the tracer solution is a salt solution.

4. The method for measuring the flow velocity and the flow direction and geological parameters of groundwater through cross holes of wells according to claim 1, wherein for each test, the time when the solubility of the tracer solution reaches a maximum value and remains stable is taken as an end time point, and the test time when a highest solubility value is reached is an end time point.

5. The method for measuring the flow velocity and the flow direction and geological parameters of groundwater through cross holes of wells according to claim 1, wherein the conductivity and temperature of groundwater are tested in the boreholes, and a concentration of a tracer solution in the groundwater is obtained according to a correspondence between the conductivity and the tracer solution concentration measured at different temperatures in the laboratory; and when the data acquisition instrument acquires data, the time is recorded synchronously, thereby obtaining a distribution curve of the tracer solution solubility with time.

\* \* \* \* \*